(12) United States Patent
Wu et al.

(10) Patent No.: US 11,953,718 B2
(45) Date of Patent: Apr. 9, 2024

(54) DISPLAY APPARATUS AND DISPLAY METHOD

(71) Applicant: HKC Corporation Limited, Guangdong (CN)

(72) Inventors: Li Wu, Guangdong (CN); Baohong Kang, Guangdong (CN)

(73) Assignee: HKC CORPORATION LIMITED, Guangdong (CN)

( * ) Notice: Subject to any disclaimer, the term of this patent is extended or adjusted under 35 U.S.C. 154(b) by 0 days.

(21) Appl. No.: 18/089,965

(22) Filed: Dec. 28, 2022

(65) Prior Publication Data

US 2023/0408756 A1   Dec. 21, 2023

(30) Foreign Application Priority Data

Jun. 17, 2022 (CN) .......................... 202210683239.8

(51) Int. Cl.
*F21V 8/00* (2006.01)
*G02F 1/13* (2006.01)
*G02F 1/13357* (2006.01)

(52) U.S. Cl.
CPC ......... *G02B 6/0091* (2013.01); *G02B 6/0076* (2013.01); *G02F 1/1323* (2013.01); *G02F 1/133615* (2013.01)

(58) Field of Classification Search
CPC ... G02B 6/0091; G02B 6/0076; G02F 1/1323; G02F 1/133615
See application file for complete search history.

(56) References Cited

U.S. PATENT DOCUMENTS

| 2010/0177498 A1 | 7/2010 | Choi et al. |
| 2018/0267344 A1* | 9/2018 | Wu ....................... G02B 6/0036 |

FOREIGN PATENT DOCUMENTS

| CN | 103062676 A | 4/2013 |
| CN | 106054453 A | 10/2016 |
| CN | 206057756 U | 3/2017 |
| CN | 106802499 A | 6/2017 |
| CN | 112684636 A | 4/2021 |
| CN | 215340417 U | 12/2021 |
| JP | 2000081847 A | 3/2000 |
| JP | 2007108265 A | 4/2007 |
| JP | 2010123257 A | 6/2010 |

OTHER PUBLICATIONS

CN First Office Action dated Jul. 28, 2022 issued in CN 202210683239.8.

* cited by examiner

*Primary Examiner* — Donald L Raleigh
(74) *Attorney, Agent, or Firm* — Scully, Scott, Murphy & Presser, P.C.

(57) ABSTRACT

A display apparatus and a display method are provided. The display apparatus includes a display panel, a display film assembly, a privacy film assembly, and a light source. The display film assembly includes a first light guide plate and an optical film. The optical privacy film assembly includes a second light guide plate and a privacy film. The privacy film is configured to adjust divergent lights exiting the second light guide plate into privacy lights at a preset angle. The light source is configured to emit incident lights to be selectively irradiated to the first light guide plate or the second light guide plate, so that the display apparatus is able to switch between a normal display mode and a privacy display mode.

9 Claims, 5 Drawing Sheets

DISPLAY APPARATUS AND DISPLAY METHOD

CROSS-REFERENCE TO RELATED APPLICATIONS

This application claims priority under 35 U.S.C. § 119(a) to Chinese Patent Application No. 2022106832398, filed Jun. 17, 2022, the entire disclosure of which is incorporated herein by reference.

TECHNICAL FIELD

The disclosure relates to the field of display technology, and in particular, to a display apparatus and a display method.

BACKGROUND

With the development of network technology, more and more people shop or conduct account transactions or other operations online. During the operations, the user often needs to input personal information, passwords, and other private information on display apparatuses such as computers and mobile phones, and people around the user may view the private information, which causes the leakage of the private information of the user. Therefore, more and more display apparatuses have a privacy protection function.

However, in existing display apparatuses, a privacy film is usually attached onto the light-exiting surface of the display panel to achieve a privacy protection effect, so the display apparatus cannot realize the switching between a normal display function and a privacy display function. Therefore, the display apparatus cannot satisfy diverse display requirements, thereby reducing the user experience.

SUMMARY

In a first aspect, the disclosure provides a display apparatus. The apparatus includes a display panel, a display film assembly, a privacy film assembly, and a light source. The display film assembly is disposed on a light-incident side of the display panel and includes a first light guide plate and an optical film. The optical film is disposed on one side of the first light guide plate facing the display panel. The privacy film assembly includes a second light guide plate and a privacy film. The privacy film is disposed between the first light guide plate and the second light guide plate. The privacy film is configured to adjust divergent lights exiting the second light guide plate into privacy lights at a preset angle. The light source is configured to emit incident lights to be selectively irradiated to the first light guide plate or the second light guide plate, so that the display apparatus is able to switch between a normal display mode and a privacy display mode. In the normal display mode, the incident lights are irradiated to the first light guide plate, and divergent lights exiting the first light guide plate are transmitted to the display panel through the optical film. In the privacy display mode, the incident lights are irradiated to the second light guide plate and then incident on the privacy film, and transmitted to the display panel through the first light guide plate and the optical film in sequence.

In a second aspect, the disclosure further provides a display method. The method is applicable to the display apparatus of the first aspect. The display method includes the following. A first instruction indicating to switch to the normal display mode is received, and the light source is controlled to illuminate the first light guide plate according to the first instruction, so that the incident lights emitted by the light source are diffused through the first light guide plate and transmitted to the display panel through the optical film, and the display panel performs normal display based on the lights incident on the display panel. A second instruction indicating to switch to the privacy display mode is received, and the light source is controlled to illuminate the second light guide plate according to the second instruction, so that the incident lights emitted by the light source are diffused through the second light guide plate and then incident on the privacy film, and transmitted to the display panel through the first light guide plate and the optical film in sequence, and the display panel performs privacy display based on the lights incident on the display panel.

BRIEF DESCRIPTION OF THE DRAWINGS

To describe technical solutions in implementations of the present disclosure or in the related art more clearly, the following briefly introduces the accompanying drawings required for describing the implementations or the related art. Apparently, the accompanying drawings in the following description illustrate some implementations of the present disclosure. Those of ordinary skill in the art may also obtain other drawings based on these accompanying drawings without creative efforts.

DESCRIPTION OF MAIN COMPONENT SYMBOLS

| | |
|---|---|
| display apparatus | 100, 100a |
| display panel | 1 |
| display film assembly | 2 |
| optical film | 21 |
| first light guide plate | 24 |
| reflecting member | 25 |
| privacy film assembly | 3 |
| privacy film | 31 |
| second light guide plate | 32 |
| light source | 4, 4a |
| first light-emitting element | 401 |

| | |
|---|---|
| second light-emitting element | 402 |
| light-bar unit | 40 |
| light bead | 41 |
| light bar | 42 |
| adhesive strip | 43 |
| movable bracket | 44 |
| mounting plate | 441 |
| supporting plate | 442 |
| avoidance space | 440 |
| magnetizable member | 45 |
| back plate | 5 |
| first limiting member | 501 |
| connecting plate | 51 |
| guide plate | 52 |
| limiting plate | 53 |
| electromagnet structure | 6 |
| electromagnet body | 61 |
| main body part | 611 |
| mounting part | 612 |
| fixing base | 62 |
| first support | 621 |
| second support | 622 |
| jacking structure | 7 |
| jacking block | 71 |
| second limiting member | 72 |
| locking member | 73 |
| casing | 74 |
| elastic member | 75 |
| spring | 751, 752, 753 |

The detailed description below will further illustrate the disclosure with reference to the drawings.

DETAILED DESCRIPTION

The following will clearly and completely describe technical solutions in implementations of the disclosure with reference to the accompanying drawings. Apparently, implementations described herein are merely some implementations, rather than all implementations, of the disclosure. Based on the implementations described herein, all other implementations obtained by those of ordinary skill in the art without creative effort shall fall within the protection scope of the disclosure.

It should be understood that the terms in the description, claims, and the drawings of the disclosure are merely for describing specific implementations, and are not intended to limit the disclosure. The terms "first", "second", and the like in the description, claims, and the drawings of the disclosure are used to distinguish different objects, rather than to describe a specific order. The singular forms "a" and "the" are intended to include a plural form, unless the context clearly dictates otherwise. The term "comprising", "including", and any variations thereof are intended to cover non-exclusive inclusion. In addition, the disclosure can be implemented in many various forms, and is not limited to implementations described herein. The following specific implementations are provided for better and complete understanding of the disclosure, where words "up", "down", "left", "right", or the like that indicate orientations refer to the position of a structure illustrated in the corresponding drawing.

Preferred implementations of the disclosure are subsequently described in the description, but the description is for the purpose of explaining the general principles of the disclosure and is not intended to limit the scope of this disclosure. The scope of protection of the disclosure is defined by the appended claims.

Figure 1:
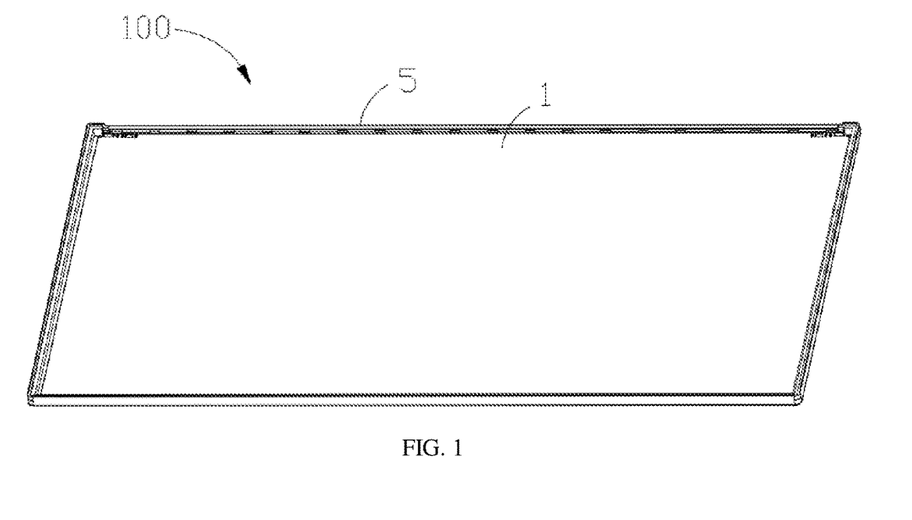
FIG. 1 is a schematic structural diagram of a display apparatus provided in a first implementation of the disclosure.
Figure 2:
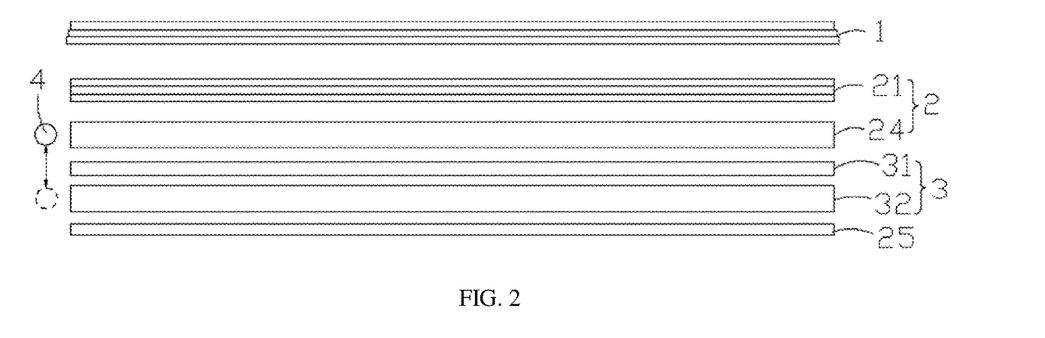
FIG. 2 is a schematic structural diagram illustrating a partial structure of the display apparatus in FIG. 1.

Referring to FIGS. 1 and 2, FIG. 1 is a schematic structural diagram of a display apparatus 100 provided in a first implementation of the disclosure, and FIG. 2 is a schematic structural diagram illustrating a partial structure of the display apparatus 100. The display apparatus 100 includes a display panel 1, a display film assembly 2, a privacy film assembly 3, and a light source 4. The display film assembly 2 includes a first light guide plate 24 and an optical film 21. The optical film 21 is disposed on one side of the first light guide plate 24 facing the display panel 1. The optical film 21 is configured to transmit lights exiting the first light guide plate 24 to the display panel 1. The privacy film assembly 3 includes a second light guide plate 32 and a privacy film 31. The privacy film 31 is disposed between the first light guide plate 24 and the second light guide plate 32. The privacy film 31 is configured to adjust divergent lights exiting the second light guide plate 32 into privacy lights at a preset angle. The light source 4 is configured to emit incident lights to be selectively irradiated to the first light guide plate 24 or the second light guide plate 32, so that the display apparatus 100 is able to switch between a normal display mode and a privacy display mode. In the normal display mode, the incident lights are irradiated to the first light guide plate 24. In the privacy display mode, the incident lights are irradiated to the second light guide plate 32.

According to the display apparatus 100 provided in implementations of the disclosure, the privacy film 31 is disposed between the first light guide plate 24 and the second light guide plate 32 and configured to adjust the divergent lights exiting the second light guide plate 32 into the privacy lights at the preset angle, the incident lights emitted by the light source 4 can be selectively irradiated to the first light guide plate 24 or the second light guide plate 32, so that the display apparatus 100 is able to switch between the normal display mode and the privacy display mode. In this way, in the privacy display mode, the display apparatus 100 can prevent information displayed on the display panel 1 from leaking with high security, and in the normal display mode, the user can view displayed content from various visual angles, so that the display apparatus 100 can satisfy diverse display requirements.

It should be understood by those skilled in the art that, FIG. 1 merely illustrates an example of the display apparatus 100 and does not constitute a limitation on the display apparatus 100. The display apparatus 100 may include more or less components than those illustrated in FIG. 1, or combine certain components or different components. For example, the display apparatus 100 may further include a main control circuit board and the like.

The light source 4 serves as an edge-lit light source 4 for the first light guide plate 24 and the second light guide plate 32. The first light guide plate 24 and the second light guide plate 32 are configured to convert a point light source 4 or a line light source 4 originated from the light source 4 into a surface light source. Specifically, the light source 4 is located on one side of the first light guide plate 24 and the second light guide plate 32, and the side is perpendicular to a light-exiting surface of the first light guide plate 24 and a light-exiting surface of the second light guide plate 32. The light-exiting surface and a shady surface of the first light guide plate 24 as well as the light-exiting surface and a shady surface of the second light guide plate 32 each are parallel to a light-exiting surface of the display panel 1. The light-exiting surface and the shady surface of the first light guide plate 24 as well as the light-exiting surface and the shady surface of the second light guide plate 32 are flat surfaces.

The first light guide plate 24 is a transparent light guide plate. The second light guide plate 32 may be a transparent light guide plate or an opaque light guide plate. The first light guide plate 24 and the second light guide plate 32 may refract and/or reflect lights. The first light guide plate 24 can also transmit collimated lights. Optionally, a reflective layer is disposed on the shady surface of the first light guide plate 24 and the shady surface of the second light guide plate 32. A reflective layer is also disposed on a side surface of the first light guide plate 24 and a side surface of the second light guide plate 32 opposite to the first light source 4. In this way, more incident lights emitted by the light source 4 can be emitted toward the light-exiting surface of the display panel 1, thereby improving the display effect of the display apparatus 100. The first light guide plate 24 and the second light guide plate 32 may be made of the same material, for example, Polymethyl Methacrylate (PMMA) or Polycarbonate (PC). In some implementations, the first light guide plate 24 and the second light guide plate 32 may also be made of different materials, and the first light guide plate 24 and the second light guide plate 32 may be made of existing light guide plate materials, which is not limited herein. In some other implementations, the display apparatus 100 further includes a reflecting member 25 disposed on one side of the second light guide plate 32 away from the privacy film. The reflecting member 25 is configured to reflect divergent lights exiting the first light guide plate 24 and the second light guide plate 32, so that reflected lights are emitted toward the light-exiting surface of the display panel 1, thereby improving the display effect.

The privacy film 31 is refractive. In this implementation, the privacy film 31 is configured to adjust divergent lights exiting the second light guide plate 32 into privacy lights in a single direction. Preferably, the privacy lights are collimated lights perpendicular to the display panel 1. That is, the privacy lights are parallel to the normal of the light-exiting surface of the display panel 1. In some implementations, the privacy film 31 is configured to adjust the divergent lights exiting the second light guide plate 32 into privacy lights in multiple directions, where the privacy lights each define an included angle with the normal of the light-exiting surface of the display panel 1. The included angle is within a preset angle range, for example, 0 to 20 degrees. Based on the preset angle, privacy films 31 of different specifications can be used according to usage scenarios of the display apparatus 100.

The optical film 21 includes but is not limited to a polarizing plate, an electrode layer, a phase film, and the like. The optical film 21 is configured to diffuse lights exiting the first light guide plate 24. The display panel 1 includes but is not limited to an array substrate, a color filter substrate, and a liquid crystal layer disposed between the array substrate and the color filter substrate. Technical solutions of the disclosure can be widely used in various display panels 1, such as a Twisted Nematic (TN) display panel, an In-Panel Switching (IPS) display panel, a Vertical Alignment (VA) display panel, a Multi-Domain Vertical Alignment (MVA) display panel, or also other types of display panels, such as a Liquid Crystal Display (LCD) panel, or an Organic Light-Emitting Diode (OLED) display, all of which the above scheme is suitable for.

Figure 3:
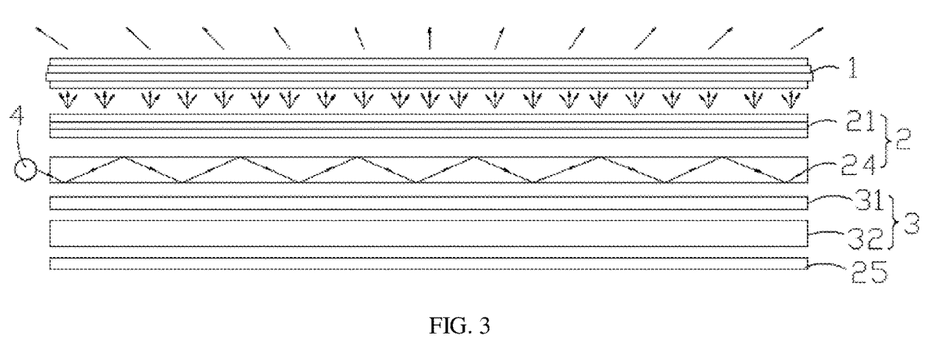
FIG. 3 is a schematic structural diagram of the display apparatus in FIG. 1 in a normal display mode.
Figure 4:
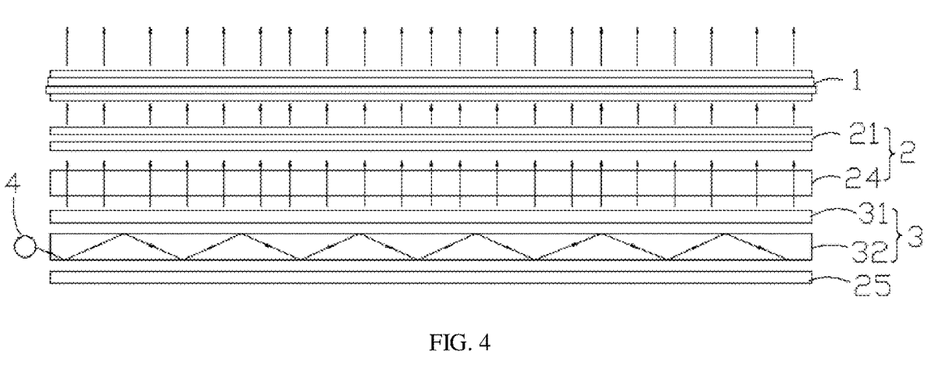
FIG. 4 is a schematic structural diagram of the display apparatus in FIG. 1 in a privacy display mode.
Figure 5:
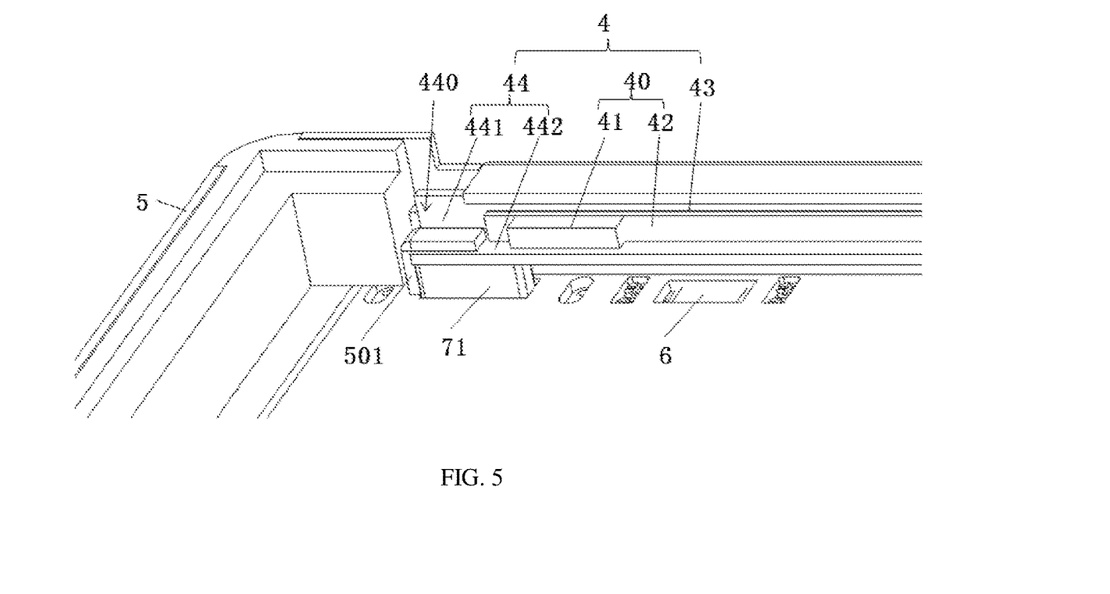
FIG. 5 is an enlarged view of a partial structure of the display apparatus in FIG. 1.

Referring to FIGS. 3 and 4, when the display apparatus 100 enters the normal display mode, the incident lights emitted by the light source 4 are irradiated to the first light guide plate 24, refracted and/or reflected in the first light guide plate 24, and then incident on the optical film 21. Divergent lights exiting the first light guide plate 24 are diffused through the optical film 21 and then enter the display panel 1. Therefore, the display panel 1 performs normal display based on the lights incident on the display panel 1, to present shared content to the user. When the display apparatus 100 enters the privacy display mode, the incident lights emitted by the light source 4 are irradiated to the second light guide plate 32, refracted and/or reflected in the second light guide plate 32, and then incident on the privacy film 31, and transmitted to the display panel 1 through the first light guide plate 24 and the optical film 21 in sequence. The privacy film 31 can refract diffused lights exiting the second light guide plate 32, and only collimated lights can pass through the second light guide plate 32, therefore, the display panel 1 performs privacy display based on the lights incident on the display panel 1.

Referring to FIGS. 1, 2, and 5 to 6, the display apparatus 100 further includes a back plate 5 for installing the display panel 1, the display film assembly 2, the privacy film assembly 3, and the light source 4. In this implementation, the light source 4 is movably disposed on the back plate 5, so that the incident lights emitted by the light source 4 can be selectively irradiated to the first light guide plate 24 or the second light guide plate 32. Specifically, the light source 4 can move up and down along a Z-axis of the back plate 5 (i.e., in a direction perpendicular to the display panel 1). That is, the light source 4 can move between a first position corresponding to a side edge of the first light guide plate 24 and a second position corresponding to a side edge of the second light guide plate 32, so that the display apparatus 100 can switch between the normal display mode and the privacy display mode.

The light source 4 includes a movable bracket 44 movably disposed on the back plate and a light-bar unit 40 fixed on the movable bracket 44. The display apparatus 100 further includes a driving mechanism. The driving mechanism is configured to drive the movable bracket 44 to drive the light-bar unit 40 to move back and forth in the Z-axis direction of the back plate 5. When the driving mechanism drives the light-bar unit 40 to move to the first position directly facing the first light guide plate 24, the light-bar unit 40 only emits incident lights on the left side of the first light guide plate 24, and in this case, the display apparatus 100 is in the normal display mode. When the driving mechanism drives the light-bar unit 40 to move to the second position directly facing the second light guide plate 32, the light-bar unit 40 only emits incident lights on the left side of the second light guide plate 32, and in this case, the display apparatus 100 is in the privacy display mode. In this implementation, the light-bar unit includes a light bar 42 and multiple light beads 41 disposed on the light-bar unit 40 at intervals. The multiple light beads 41 are disposed on one side of the light bar 42 away from the movable bracket 44. The multiple light beads 41 are protruded on the light bar 42. In this implementation, the multiple light beads 41 are disposed at opposite ends of the light bar 42, so that lights emitted by the light beads 41 on the light bar 42 can be randomly reflected by the shady surface of the first light guide plate 24 and the shady surface of the second light guide plate. In this way, lights exiting the first light guide plate 24 and the second light guide plate can be relatively uniform, thereby ensuring the light emission effect of the display apparatus 100. In some implementations, the light beads 41 may also be omitted. That is, the light-bar unit 40 may only include the light bar 42 disposed on the movable bracket 44.

The light-bar unit 40 can be fixed on the movable bracket 44 through bonding, welding, or mechanical connection. For example, the light bar 42 can be fixed on the movable bracket 44 through a mounting structure, where the mounting structure is, for example, but not limited to, a snap structure, a screw locking structure, and the like. In this implementation, the light source 4 further includes an adhesive strip 43, and the light bar 42 is fixed on the movable bracket 44 through the adhesive strip 43. The movable bracket 44 is substantially L-shaped. The movable bracket 44 includes a mounting plate 441 and a supporting plate 442. The light-bar unit is mounted on the mounting plate 441, such that the light-bar unit 40 faces a side wall of the first light guide plate 24 and a side wall of the second light guide plate 32. The supporting plate 442 is configured to support the light-bar unit 40, so as to ensure the stability and the reliability of the connection between the light-bar unit 40 and the movable bracket 44.

Optionally, the thickness of the light-bar unit 40 in a direction perpendicular to the display panel 1 is less than or approximately equal to each of the thickness of the first light guide plate 24 and the thickness of the second light guide plate 32 in the direction perpendicular to the display panel 1, so as to ensure that incident lights emitted by the light-bar unit 40 enter only through the side wall of the first light guide plate 24 or the second light guide plate 32, thereby ensuring that the display apparatus 100 can have different light emission effects in different operation modes.

In some implementations, driving mechanisms are correspondingly disposed on opposite ends of the movable bracket 44, so as to ensure that the light bar 42 can move stably in the Z-axis direction of the back plate 5 following the movable bracket 44, thereby ensuring that more incident lights emitted by the light-bar unit 40 can enter the first light guide plate 24 or the second light guide plate 32. In some other implementations, a driving mechanism is disposed in the middle part of the movable bracket 44. Alternatively, a driving mechanism is disposed at another position on the back plate 5 corresponding to the movable bracket 44. The positions and/or the number of the driving mechanisms can be determined according to specifications such as the type and the size of the display apparatus 100, which is not limited herein. For example, when the display apparatus 100 is a mobile phone, two driving mechanisms may be correspondingly disposed at opposite ends of the movable bracket 44. When the display apparatus 100 is a tablet, three or more driving mechanisms may be disposed at positions corresponding to the opposite ends and the middle part of the movable bracket 44.

In this implementation, the driving mechanism includes an elastic jacking structure 7 and an electromagnet structure 6. The jacking structure 7 abuts against the movable bracket 44. The electromagnet structure 6 is configured to attract and fix the movable bracket 44 or release the movable bracket 44. When the electromagnet structure 6 is powered on, the electromagnet structure 6 attracts the movable bracket 44, and the movable bracket 44 presses against the jacking structure 7 to elastically deform an elastic member 75, so that the light-bar unit 40 directly faces the second light guide plate 32, where a magnetic force of the electromagnet structure 6 is greater than an elastic force of the jacking structure 7. When the electromagnet structure 6 is powered off, the electromagnet structure 6 releases the movable bracket 44, and the elastic member 75 is restored from elastic deformation and abuts against the movable bracket 44, so that the light-bar unit 40 directly faces the first light guide plate 24, where the magnetic force of the electromagnet structure 6 is smaller than the elastic force of the jacking structure 7. In the disclosure, the elastic jacking structure 7 and the electromagnet structure 6 are configured to cooperate with each other, thereby simplifying the overall mechanism of the driving mechanism, and ensuring that the light-bar unit 40 can move up and down stably following the movable bracket 44.

In some implementations, the driving mechanism may include a driving motor. The driving motor is configured to drive the movable bracket 44 to move up and down in the Z-axis direction of the back plate 5. Alternatively, the driving mechanism may only include the electromagnet structure 6, and the height of the movable bracket 44 is positioned by controlling the magnetic force of the electromagnet structure 6. The driving mechanism can also be other structures that can be used to drive the movable bracket 44 to move up and down, which is not limited herein.

Referring to FIGS. 1, 2, and 6 to 8, in this implementation, the movable bracket 44 is made of a magnetizable material, thereby simplifying the structure of the movable bracket 44. The magnetizable material includes, but is not limited to, stainless steel, iron, cobalt, nickel, cast steel, silicon steel, and the like. In some implementations, a magnetizable member 45 is disposed at a position on the movable bracket 44 corresponding to the electromagnet structure 6, thereby saving materials and reducing the production cost of the movable bracket 44. The magnetizable member 45 is made of the above-mentioned magnetizable material. The magnetizable member 45 is embedded in the movable bracket 44, so that the movable bracket 44 and the back plate 5 have a compact assembly structure. The magnetizable member 45 and the movable bracket 44 are disposed coplanarly on one side near the electromagnet structure 6, so as to ensure that when the electromagnet structure 6 is powered on and attracts the magnetizable member 45, the light-bar unit 40 can directly face the second light guide plate 32. An orthographic projection of the magnetizable member 45 and an orthographic projection of the electromagnet structure 6 in the Z-axis direction of the back plate 5 are coincident or partially overlapped.

Figure 6:
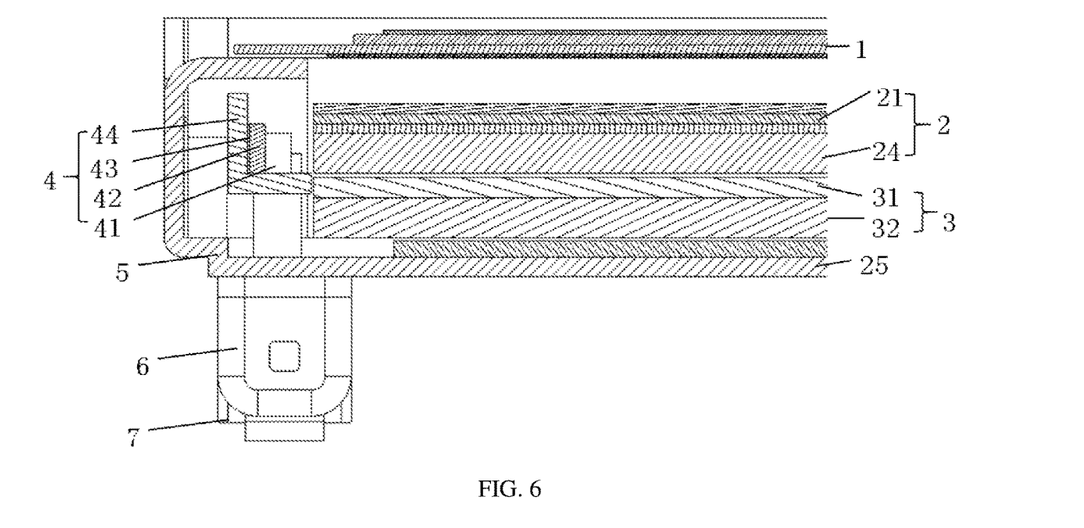
FIG. 6 is a cross-sectional view of the display apparatus in FIG. 1 from a first angle of view.
Figure 7:
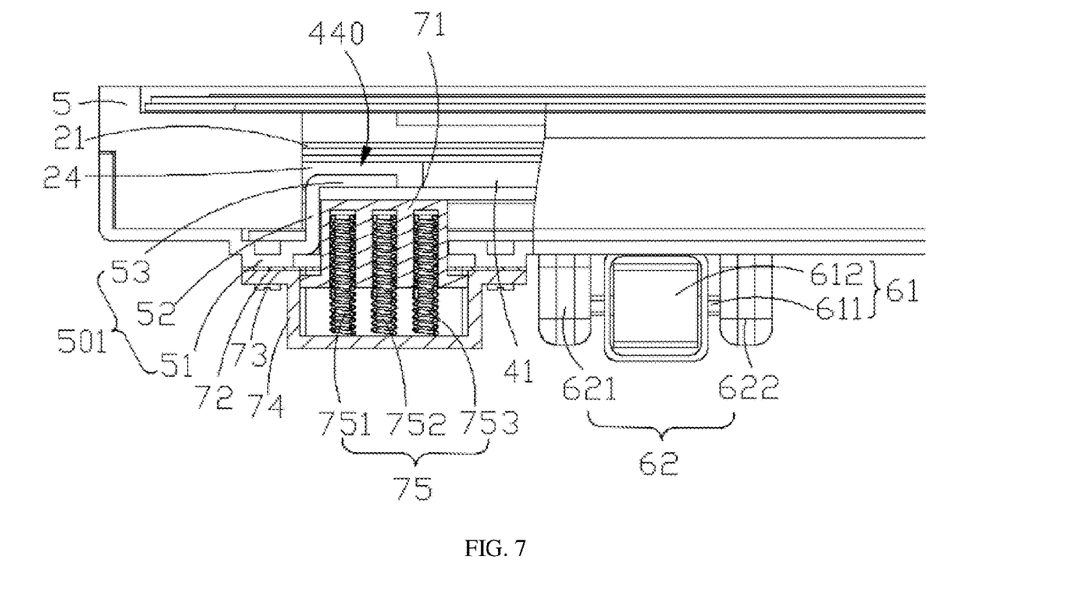
FIG. 7 is a cross-sectional view of a first implementation of the display apparatus in FIG. 1 from a second angle of view.
Figure 8:
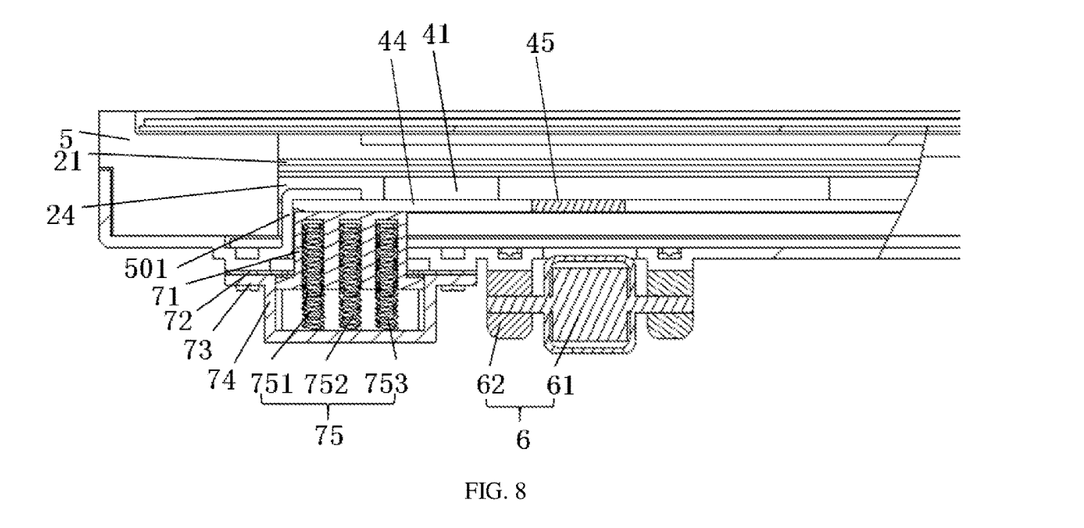
FIG. 8 is a cross-sectional view of a second implementation of the display apparatus in FIG. 1 from a second angle of view.

In some implementations, the jacking structure 7 includes a fixed end fixedly connected to the back plate 5 and a free end opposite to the fixed end. The movable bracket 44 is fixed on the free end of the jacking structure 7, so that the movable bracket 44 can drive the light-bar unit 40 move up and down in the Z-axis direction of the back plate 5 following the jacking structure 7, thereby avoiding displacement of the light-bar unit 40 when the light-bar unit moves up and down, and ensuring the stability and the reliability of the light-bar unit 40 when the light-bar unit 40 moves up and down in the Z-axis direction of the back plate 5. In some other implementations, the movable bracket 44 may also detachably abut against the free end of the jacking structure 7, so as to facilitate the disassembly and the assembly of the assembly structure.

Optionally, the jacking structure 7 and the electromagnet structure 6 are disposed on the same side of the light-bar unit 40, so that the display apparatus 100 has a more compact assembly structure, and thus the display apparatus 100 can be made thinner. In some implementations, the jacking structure 7 and the electromagnet structure 6 may also be disposed on different sides of the light-bar unit 40. For example, the movable bracket 44 is fixedly connected with the free end of the jacking structure 7, the jacking structure 7 is disposed below the movable bracket 44, and the electromagnet structure 6 is disposed above the movable bracket 44. When the electromagnet structure 6 is powered on, the electromagnet structure 6 attracts the movable bracket 44, and the movable bracket 44 presses against the jacking structure 7 to elastically deform the elastic member 75, so that the light-bar unit 40 directly faces the first light guide plate 24, where the magnetic force of the electromagnet structure 6 is greater than the elastic force of the jacking structure 7. When the electromagnet structure 6 is powered off, the electromagnet structure 6 releases the movable bracket 44, and the elastic member 75 is restored from elastic deformation and abuts against the movable bracket 44, so that the light-bar unit 40 directly faces the second light guide plate 32, where the magnetic force of the electromagnet structure 6 is smaller than the elastic force of the jacking structure 7.

Optionally, the back plate 5 includes a first limiting member 501. The movable bracket 44 is disposed between the first limiting member 501 and the jacking structure 7. The first limiting member 501 is configured to stop the movable bracket 44, so that the light-bar unit is aligned with the first light guide plate 24, thereby ensuring the light emission effect of the display apparatus 100 in the normal display mode. Specifically, the first limiting member 501 includes a connecting plate 51, a guide plate 52, and a limiting plate 53 connected in sequence. The connecting plate 51 is fixed on the back plate 5. The guide plate 52 is slidably attached to the jacking structure 7 and a side wall of the movable bracket 44, thereby further ensuring the stability of the light-bar unit 40 when moving up and down with the movable bracket 44. The limiting plate 53 is configured to stop one end of the movable bracket 44 away from the jacking structure 7. Specifically, the first limiting member 501 is sandwiched between the supporting plate 442 of the movable bracket 44 and the jacking structure 7. The mounting plate 441, the supporting plate 442, and the light-bar unit 40 define an avoidance space 440 therebetween for accommodating the limiting plate 53. Optionally, the limiting plate 53 is spaced apart from the light-bar unit 40, so as to prevent the limiting plate 53 from scratching the light-bar unit 40.

The jacking structure 7 includes a casing 74 fixed on the back plate 5, a jacking block 71 movably connected to the casing 74, and the elastic member 75 disposed between the casing 74 and the jacking block 71, where the jacking block 71 elastically abuts against the light-bar unit 40 through the elastic member 75. In this implementation, the jacking block 71 is movably received in the inner cavity of the casing 74. The elastic member 75 is a spring. In some other implementations, the elastic member 75 may also be, but not limited to, other elastic structures such as an elastic sheet, a sponge, and the like. There may be one or more elastic members 75. Multiple elastic members 75 are disposed between the casing 74 and the jacking block 71 at intervals, so as to ensure the elasticity of the jacking structure 7. Optionally, the jacking structure 7 includes multiple springs 751, 752, and 753. The casing 74 and the back plate 5 can be fixedly connected together through a locking member 73. Specifically, the connecting plate 51 extends outward at the edge of the casing 74. The casing 74 is fixedly connected to the back plate 5 through the connecting plate 51. The connecting plate 51 defines a through hole for the locking member 73 to pass through, and the back plate 5 defines a locking hole corresponding to the through hole, so that the locking member 73 can pass through the through hole defined by the connecting plate 51 and be locked in the locking hole defined by the back plate 5, thereby realizing the fixed connection between the casing 74 and the back plate 5. It can be understood that the casing 74 and the back plate 5 can also be fixedly connected together through snapping, welding, bonding, etc., which is not limited herein.

In some implementations, one end of the elastic member 75 is fixed to the jacking block 71, and the other end of the elastic member 75 is fixed to the casing 74. In some other implementations, one end of the elastic member 75 is fixed to the jacking block 71 or the casing 74. For example, in this implementation, the jacking block 71 defines a slot for snapping the elastic member 75, and the part of the elastic member 75 exposed from the slot elastically abuts against the casing 74, thereby simplifying the installation of the assembly structure. In addition, the elastic member 75 is not easily to be deformed excessively, so as to ensure that the elastic member 75 is easily to restore to its original shape from deformation, thereby prolonging the service life of the elastic member 75 and thus the service life of the jacking structure 7.

Optionally, the jacking structure 7 further includes a second limiting member 72. The jacking block 71 includes an abutting part abutting against the movable bracket 44 and a stopping part protruding from the abutting part. The second limiting member 72 stops the stopping part, so that the light-bar unit 40 is aligned with the first light guide plate 24. In this implementation, the second limiting member 72 is sandwiched between the casing 74 and the back plate 5. The second limiting member 72, the casing 74, and the back plate 5 are fixedly connected together through the locking member 73. The second limiting member 72, the casing 74, and the back plate 5 may also be fixedly connected together through bonding, welding, etc., which is not limited herein. In some other implementations, the second limiting member 72 may also be disposed on the casing 74 or the back plate 5. For example, the second limiting member 72 is integrally formed with the back plate 5. Alternatively, the second limiting member 72 is detachably fixed on the casing 74.

The second limiting member 72 and the casing 74 define a first limiting space therebetween, and the stopping part of the jacking structure 7 is limited to move back and forth in the direction perpendicular to the display panel 1 within the first limiting space. The first limiting member 501 and the second limiting member define a second limiting space therebetween, and the abutting part of the jacking structure 7 is limited to move back and forth in the direction perpendicular to the display panel 1 within the second limiting space.

The electromagnet structure 6 includes a fixing base 62 fixed on the back plate 5 and an electromagnet body fixed on the fixing base 62. The fixing base 62 is located on one side of the movable bracket 44 away from the light-bar unit 40. The fixing base 62 includes a first support 621 and a second support 622. The electromagnet body includes a main body part 611 located between the first support 621 and the second support 622 and two mounting parts 612 correspondingly connected to the first support 621 and the second support 622. The two mounting parts 612 are protruded from the main body part 611.

Figure 9:
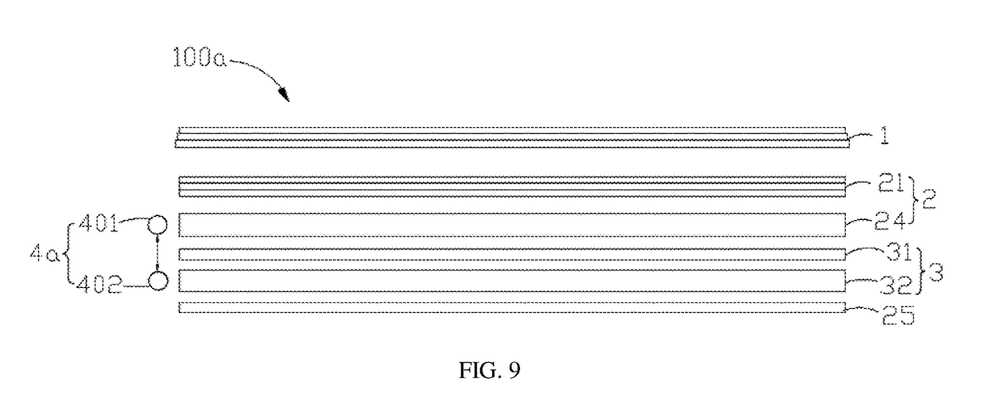
FIG. 9 is a schematic structural diagram of a display apparatus provided in a second implementation of the disclosure.

Referring to FIGS. 1, 2, and 9, FIG. 9 is a schematic structural diagram of a display apparatus 100a provided in a second implementation of the disclosure. In the second implementation, the structure of the display apparatus 100a is similar to that of the display apparatus 100 of the first implementation, except that the light source 4a of the display apparatus 100a is fixed on the back plate 5, and the driving mechanism is omitted in the display apparatus 100a. The light source 4a includes a first light-emitting element 401 and a second light-emitting element 402 which are fixedly disposed on the back plate 5. Incident lights emitted by the first light-emitting element 401 are irradiated to the first light guide plate 24, incident lights emitted by the second light-emitting element 402 are irradiated to the second light guide plate 32, and the first light-emitting element 401 and the second light-emitting element 402 are configured to work alternately.

In this implementation, the first light-emitting element 401 and the second light-emitting element 402 serve as edge-lit light sources for the first light guide plate 24 and the second light guide plate 32. The first light-emitting element faces the first light guide plate 24, and the second light-emitting element faces the second light guide plate 32. When the display apparatus 100 enters the normal display mode, the first light-emitting element works, and the second light-emitting element stops working. The incident lights emitted by the first light-emitting element are irradiated to the first light guide plate 24, refracted and/or reflected in the first light guide plate 24, and then incident on the optical film 21. Divergent lights exiting the first light guide plate 24 may be diffused through the optical film 21 and then enter the display panel 1. Therefore, the display panel 1 performs normal display based on the lights incident on the display panel 1, to present shared content to the user. When the display apparatus 100 enters the privacy display mode, the second light-emitting element works, and the first light-emitting element stops working. The incident lights emitted by the second light-emitting element are irradiated to the second light guide plate 32, refracted and/or reflected in the second light guide plate 32, and then incident on the privacy film 31, and transmitted to the display panel 1 through the first light guide plate 24 and the optical film 21 in sequence. The privacy film 31 can refract diffused lights exiting the second light guide plate 32, and only collimated lights can pass through the second light guide plate 32, therefore, the display panel 1 performs privacy display based on the lights incident on the display panel 1.

In some other implementations, the first light-emitting element 401 serves as an edge-lit light source for the first light guide plate 24, and the second light-emitting element 402 serves as a direct-lit backlight source for the second light guide plate 32. The incident lights emitted by the first light-emitting element 401 pass through a side surface of the first light guide plate 24, the optical film 21, and the display panel 1 in sequence, therefore, the display panel 1 performs normal display based on shared lights incident on the display panel 1. The incident lights emitted by the second light-emitting element 402 pass through a light-incident surface of the second light guide plate 32, the privacy film 31, the first light guide plate 24, the optical film 21, and the display panel 1 in sequence, therefore, the display panel 1 performs privacy display based on privacy lights.

Referring to FIGS. 1 to 10, implementations of the disclosure further provide a display method. The method is applicable to the display apparatuses 100 and 100a. The display apparatuses 100 and 100a each have the normal display mode and the privacy display mode. The display method includes the following.

Figure 10:
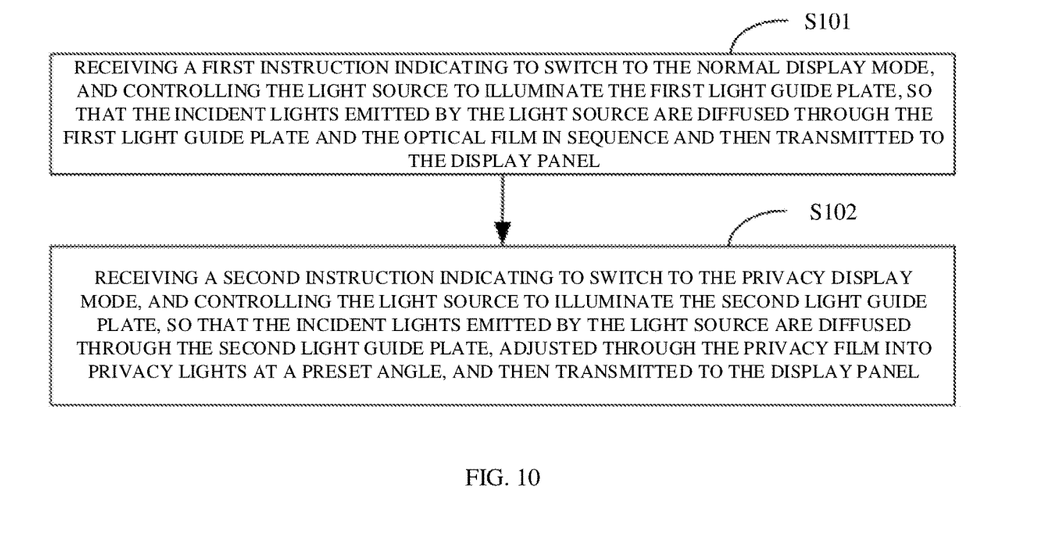
FIG. 10 is a flowchart of a display method provided in implementations of the disclosure.

At S101, a first instruction indicating to switch to the normal display mode is received, and the light source is controlled to illuminate the first light guide plate, so that the incident lights emitted by the light source are diffused through the first light guide plate and the optical film in sequence and then transmitted to the display panel.

At S102, a second instruction indicating to switch to the privacy display mode is received, and the light source is controlled to illuminate the second light guide plate, so that the incident lights emitted by the light source are diffused through the second light guide plate, adjusted through the privacy film into privacy lights at a preset angle, and then transmitted to the display panel.

In some examples, the light source 4 includes a movable bracket 44 movably disposed on the back plate 5 of the display apparatus 100 and a light-bar unit 40 fixed on the movable bracket 44. The display method further includes the following. A driving mechanism is controlled to drive the movable bracket to drive the light-bar unit to move back and forth in a direction perpendicular to the display panel, so that incident lights emitted by the light-bar unit are irradiated to the first light guide plate or the second light guide plate.

In some other examples, the light source 4a includes a first light-emitting element 401 and a second light-emitting element 402 which are fixedly disposed on the back plate 5. Incident lights emitted by the first light-emitting element 401 are irradiated to the first light guide plate 24, incident lights emitted by the second light-emitting element 402 are irradiated to the second light guide plate 32, and the first light-emitting element 401 and the second light-emitting element 402 are configured to work alternately. The display method further includes the following. The first light-emitting element is controlled to work, and the second light-emitting element is controlled to stop working, so that the incident lights emitted by the first light-emitting element are irradiated to the first light guide plate. Alternatively, the second light-emitting element is controlled to work, and the first light-emitting element is controlled to stop working, so that the incident lights emitted by the second light-emitting element are irradiated to the second light guide plate.

Implementations of the disclosure have been introduced in detail above, and the principles and implementations of the disclosure are described in the disclosure with specific examples. Descriptions of implementations are only used to help understand methods and core ideas of the disclosure. In addition, those of ordinary skill in the art may have changes in specific implementations and application scope based on the idea of the disclosure. In conclusion, the content of the disclosure should not be construed as a limitation.

What is claimed is:

1. A display apparatus comprising:
   a display panel;
   a display film assembly disposed on a light-incident side of the display panel and comprising:
      a first light guide plate; and
      an optical film disposed on one side of the first light guide plate facing the display panel;
   a privacy film assembly comprising:
      a second light guide plate; and
      a privacy film disposed between the first light guide plate and the second light guide plate and configured to adjust divergent lights exiting the second light guide plate into privacy lights at a preset angle;
   a light source configured to emit incident lights to be selectively irradiated to the first light guide plate or the second light guide plate, so that the display apparatus is able to switch between a normal display mode and a privacy display mode, wherein in the normal display mode, the incident lights are irradiated to the first light guide plate, and divergent lights exiting the first light guide plate are transmitted to the display panel through the optical film, and in the privacy display mode, the incident lights are irradiated to the second light guide plate and then incident on the privacy film, and transmitted to the display panel through the first light guide plate and the optical film in sequence, wherein
   the display apparatus further comprises a back plate, the light source is movably disposed on the back plate, so that the incident lights emitted by the light source can be selectively irradiated to the first light guide plate or the second light guide plate, wherein the light source comprises a movable bracket movably disposed on the back plate and a light-bar unit fixed on the movable bracket, the display apparatus further comprises a driving mechanism, and the driving mechanism is configured to drive the movable bracket to drive the light-bar unit to move back and forth in a direction perpendicular to the display panel.

2. The apparatus of claim 1, wherein the driving mechanism comprises an elastic jacking structure and an electromagnet structure, the jacking structure abuts against the movable bracket, the electromagnet structure is configured to attract and fix the movable bracket or release the movable bracket, wherein when the electromagnet structure is powered on, the electromagnet structure attracts the movable bracket, and the movable bracket presses against the jacking structure to elastically deform an elastic member of the jacking structure, so that the light-bar unit directly faces the second light guide plate, wherein a magnetic force of the electromagnet structure is greater than an elastic force of the jacking structure; and when the electromagnet structure is powered off, the electromagnet structure releases the movable bracket, and the elastic member is restored from elastic deformation and abuts against the movable bracket, so that the light-bar unit directly faces the first light guide plate, wherein the magnetic force of the electromagnet structure is smaller than the elastic force of the jacking structure.

3. The apparatus of claim 2, wherein the back plate comprises a first limiting member, the movable bracket is disposed between the first limiting member and the jacking structure, and the first limiting member is configured to stop the movable bracket, so that the light-bar unit is aligned with the first light guide plate.

4. The apparatus of claim 3, wherein the first limiting member comprises a connecting plate, a guide plate, and a limiting plate connected in sequence, the connecting plate is fixed on the back plate, the guide plate is slidably attached to the jacking structure and a side wall of the movable bracket, and the limiting plate is configured to stop one end of the movable bracket away from the jacking structure.

5. The apparatus of claim 2, wherein the jacking structure comprises a casing fixed on the back plate, a jacking block movably connected to the casing, and the elastic member disposed between the casing and the jacking block, wherein the jacking block elastically abuts against the light-bar unit through the elastic member.

6. The apparatus of claim 5, wherein a second limiting member is disposed on the jacking structure or the back plate, and the second limiting member is configured to stop the jacking block, so that the light-bar unit is aligned with the first light guide plate.

7. The apparatus of claim 1, wherein the display apparatus further comprises a reflecting member disposed on one side of the second light guide plate away from the privacy film, the reflecting member is configured to reflect divergent lights exiting the first light guide plate and the second light guide plate, so that reflected lights are emitted toward the display panel.

8. A display method, being applicable to a display apparatus, wherein the display apparatus comprises:
a display panel;
a display film assembly disposed on a light-incident side of the display panel and comprising:
a first light guide plate; and
an optical film disposed on one side of the first light guide plate facing the display panel;
a privacy film assembly comprising:
a second light guide plate; and
a privacy film disposed between the first light guide plate and the second light guide plate and configured to adjust divergent lights exiting the second light guide plate into privacy lights at a preset angle;
a light source configured to emit incident lights to be selectively irradiated to the first light guide plate or the second light guide plate, so that the display apparatus is able to switch between a normal display mode and a privacy display mode, wherein the display apparatus further comprises a back plate and a driving mechanism, the light source is movably disposed on the back plate, the light source comprises a movable bracket movably disposed on the back plate and a light-bar unit fixed on the movable bracket, and the method comprises:
receiving a first instruction indicating to switch to the normal display mode, and controlling the light source to illuminate the first light guide plate according to the first instruction, so that the incident lights emitted by the light source are diffused through the first light guide plate and transmitted to the display panel through the optical film, and the display panel performs normal display based on the lights incident on the display panel; or
receiving a second instruction indicating to switch to the privacy display mode, and controlling the light source to illuminate the second light guide plate according to the second instruction, so that the incident lights emitted by the light source are diffused through the second light guide plate and then incident on the privacy film, and transmitted to the display panel through the first light guide plate and the optical film in sequence, and the display panel performs privacy display based on the lights incident on the display panel, wherein the method further comprises:
controlling the driving mechanism to drive the movable bracket to drive the light-bar unit to move back and forth in a direction perpendicular to the display panel, so that incident lights emitted by the light-bar unit are irradiated to the first light guide plate or the second light guide plate.

9. The method of claim 8, wherein the driving mechanism comprises an elastic jacking structure and an electromagnet structure, the jacking structure abuts against the movable bracket, the electromagnet structure is configured to attract and fix the movable bracket or release the movable bracket, and the method further comprises:
powering on the electromagnet structure, to make the electromagnet structure attract the movable bracket, and the movable bracket press against the jacking structure to elastically deform an elastic member of the jacking structure, so that the light-bar unit directly faces the second light guide plate, wherein a magnetic force of the electromagnet structure is greater than an elastic force of the jacking structure; and
powering off the electromagnet structure, to make the electromagnet structure release the movable bracket, and the elastic member restore from elastic deformation and abut against the movable bracket, so that the light-bar unit directly faces the first light guide plate, wherein the magnetic force of the electromagnet structure is smaller than the elastic force of the jacking structure.

* * * * *